AUTOMATIC RECORD CHANGER SPEED CONTROL

Filed Aug. 7, 1956 3 Sheets-Sheet 1

INVENTOR.
Edwin S. Bara
BY
Watson D. Harbaugh
Attorney

March 7, 1961 E. S. BARA 2,973,966
AUTOMATIC RECORD CHANGER SPEED CONTROL
Filed Aug. 7, 1956 3 Sheets-Sheet 2
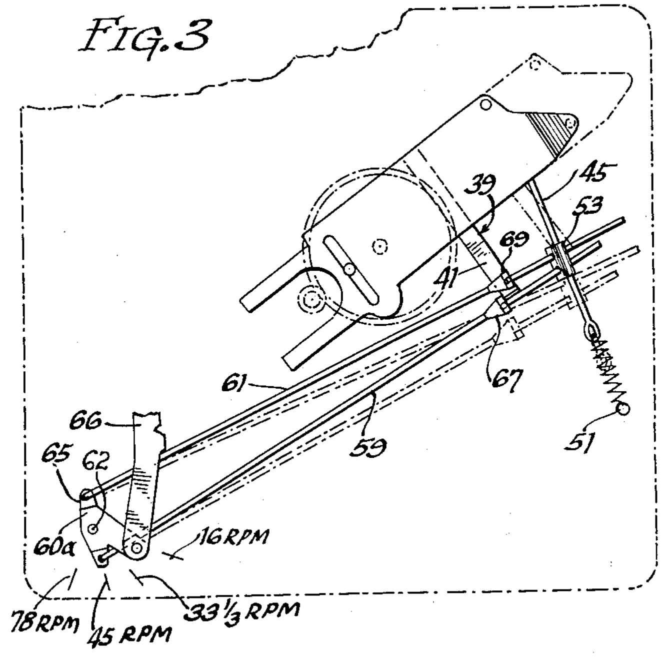
FIG. 5
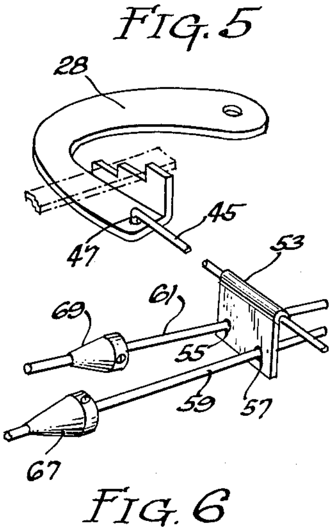
FIG. 6
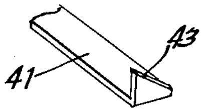
FIG. 4
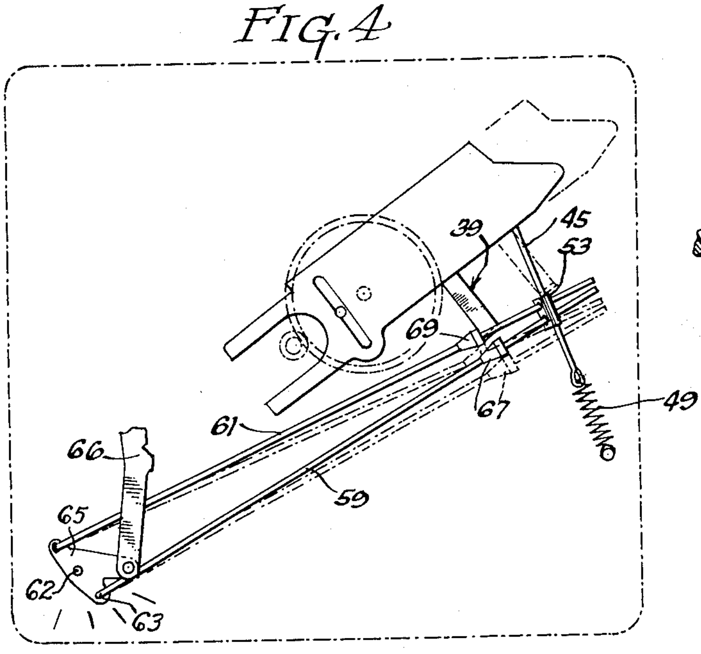
FIG. 7
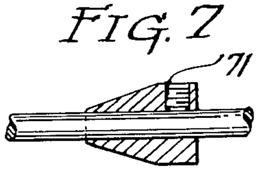
INVENTOR.
Edwin S. Bara
BY
Watson D. Harbaugh
Attorney INVENTOR.
Edwin S. Bara
BY Watson D. Harbaugh
Attorney

United States Patent Office 2,973,966
Patented Mar. 7, 1961

2,973,966

AUTOMATIC RECORD CHANGER SPEED CONTROL

Edwin S. Bara, Chicago, Ill., assignor to Webcor, Inc., Chicago, Ill, a corporation of Illinois Filed Aug. 7, 1956, Ser. No. 602,649

5 Claims. (Cl. 274—10)

This invention relates to sound reproducing apparatus and more particularly to an automatic record changer of the multi-speed type in which record tablets of different diameters may be reproduced and wherein the turntable speed may be varied automatically in response to the diameter of the record tablet deposited on the turntable upon initiation of a cycle of automatic operation. This invention contemplates the use of a record sensing and tone arm backswing indexing assembly of the type set forth in the application of Edward J. Niziolek and Edwin S. Bara, Serial No. 598,420, filed July 17, 1956. The indexing assembly shown in that application is incorporated herein by reference.

A principal object of the invention is to provide an automatic record changer of the character described wherein the turntable speed may be varied automatically to accommodate record tablets whose requisite reproducing speeds are characteristic of their diameters.

A further object of the invention is to provide an automatic record changer of the stated type wherein a tone arm control mechanism is indexed to correspond with the diameter of a particular record tablet deposited on the turntable, and on which the automatic speed changing mechanism is coordinated to the position of the tone arm control.

Another object of the invention is to provide an automatic record changer of a plurality of speeds in excess of two wherein certain speeds are selected automatically in relationship to the size of the record tablet and other speeds are selected manually independently of the size of the record tablet.

A further object of the invention is to provide an automatic record changer of the stated type in which a constant supply of power is available for changing the turntable speed, throughout the record-changing cycle.

A more particular object of the invention is to provide an automatic record changer of the sliding carriage type in which an indexing assembly is provided to limit the backswing of the tone arm to correspond to the diameter of a record tablet dropped on the turntable and in which a pair of push rods are movable in response to the movement of the indexing assembly so that the sliding of the carriage may effect a change of turntable speed from 45 r.p.m. to 33⅓ r.p.m. or vice versa, as required.

Other and further objects, advantages and features of the present invention will be apparent to those skilled in the art from the following description, taken in conjunction with the accompanying drawings in which similar reference characters relate to similar parts and in which.

Figures 2, 2A:
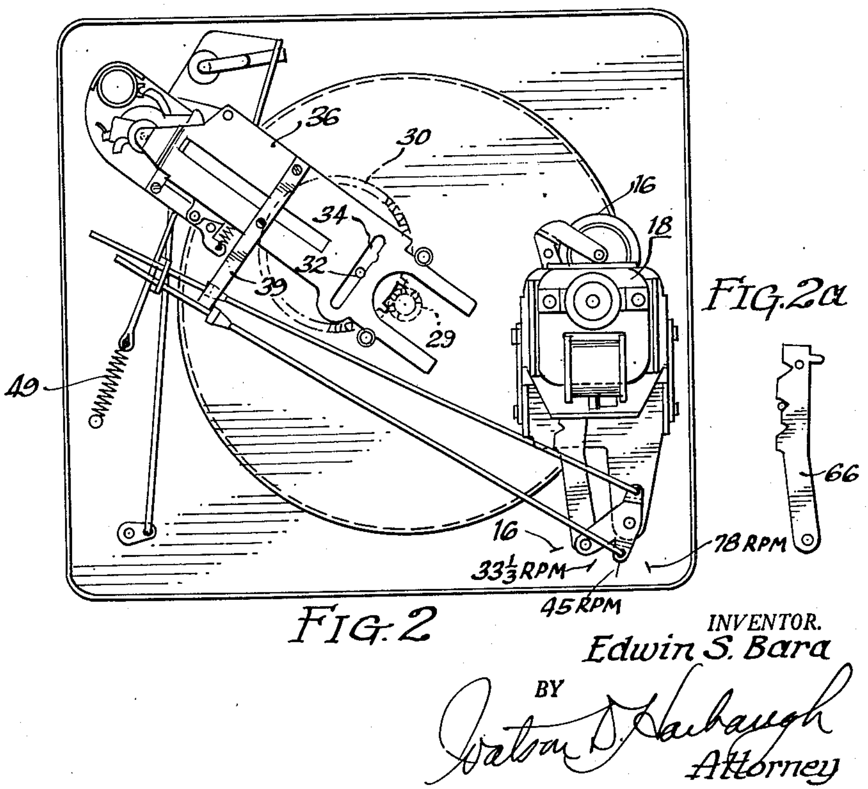
Fig. 2 is a bottom plan view showing the position the speed mechanism assumes when changing the speed of the turntable to 45 r.p.m.
Figures 8, 8A, 8B, 9, 9A, 9B, 10, 10A:
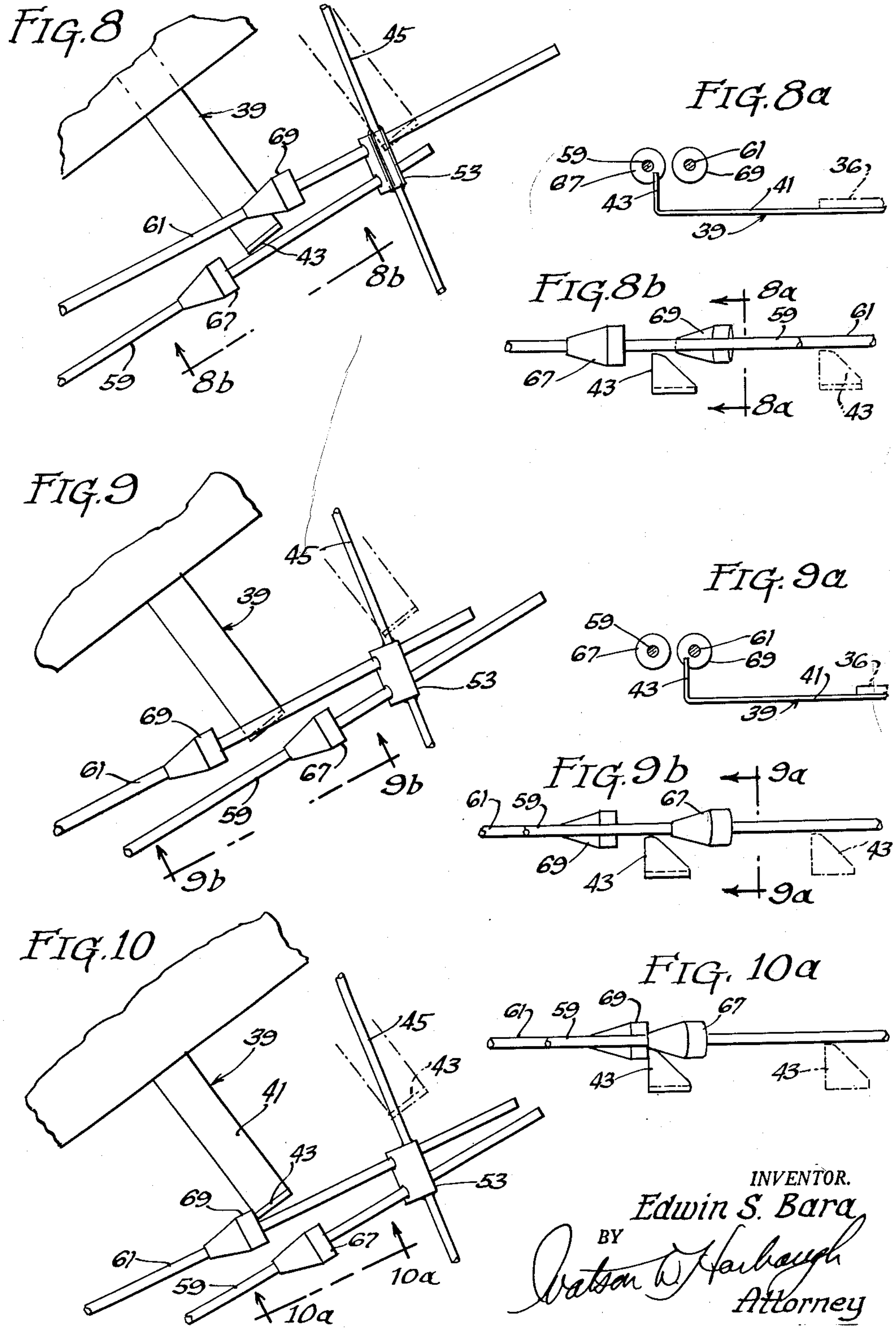

Fig. 2*a* is a bottom plan view of a cam plate forming a part of the motor shifting mechanism shown in Fig. 2;

Fig. 3 is a top plan view of the speed changing mechanism of the present invention showing the outline of the motorboard in dot-and-dash lines, showing in solid lines the position the push rods assume as the speed of the turntable is changed to 45 r.p.m., and showing in dot-and-dash lines the position the push rods assume as the speed of the turntable is changed to 33⅓ r.p.m.;

Fig. 4 is a view similar to Fig. 3, but showing the push rods in the position they assume as the speed of the turntable is changed to 33⅓ r.p.m. in response to the dropping of a record of 10 inches diameter on the turntable;

Fig. 5 is an enlarged fragmentary view in perspective showing the relationship between the indexing assembly and the push rods;

Fig. 6 is a fragmentary view in perspective of an actuator bar for moving the push rods;

Fig. 7 is a fragmentary elevational view, partly in section, showing an actuator dog in operative position on a push rod;

Fig. 8 is an enlarged fragmentary view of the speed changing mechanism of the present invention and showing the relationship between the actuator bar and the dogs of the push rods when the turntable is set for rotation at 78 r.p.m.;

Fig. 8*a* is an elevational view, partly in section, taken substantially on line 8*a*—8*a* of Fig. 8*b*;

Fig. 8*b* is an elevational view taken substantially on line 8*b*—8*b* of Fig. 8;

Fig. 9 is a view similar to Fig. 8 but showing the speed changing mechanism in the position it assumes when the turntable speed is set for 16 r.p.m.;

Fig. 9*a* is an elevational view, partly in section, taken substantially on line 9*a*—9*a* of Fig. 9*b*;

Fig. 9*b* is an elevational view taken substantially on line 9*b*—9*b* of Fig. 9;

Fig. 10 is a view similar to Figs. 8 and 9 but showing the actuator bar and the push rod dogs in the position they assume when a record of 12 inches diameter is dropped upon the turntable;

Fig. 10*a* is an elevational view taken substantially on line 10*a*—10*a* of Fig. 10.

Figure 1:
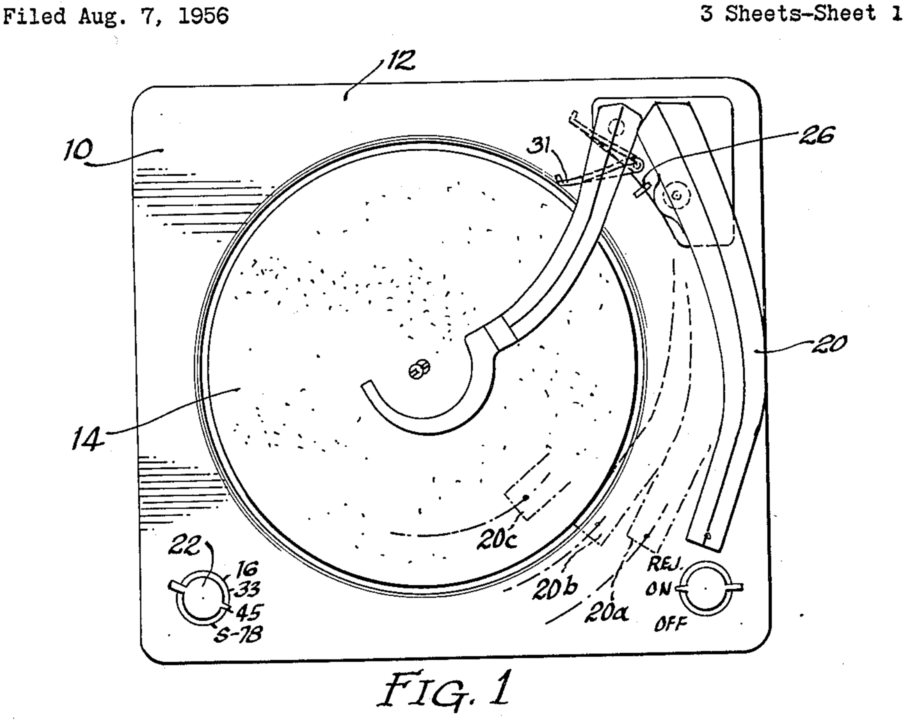
Fig. 1 is a top plan view of a record changer made in accordance with the present invention showing the tone arm in full lines in the position it assumes when it rests, and showing in dot-and-dash lines the positions the tone arm assumes when reproducing record tablets of 12 inches diameter, 10 inches diameter and 7 inches diameter, respectively.

The automatic record changer speed control of the present invention is adapted for use with an automatic record changer of the sliding carriage type. With reference now more particularly to Figs. 1 and 2, the record changer, indicated generally by reference numeral 10, includes a motorboard 12, a turntable 14 driven through the medium of a friction wheel 16 by a motor 18, and a tone arm 20. The tone arm 20 is pivotally mounted on the motorboard 12 for movement from a rest position shown in solid lines in Fig. 1 to the position shown in dot-and-dash lines at 20*a* for reproduction of a 12-inch record tablet at 33⅓ r.p.m., or to the position shown in dot-and-dash lines at 20*b* for reproduction of a 10-inch record at 33⅓ r.p.m., or to the position shown in dot-and-dash lines at 20*c* for reproduction of a 7-inch record at 45 r.p.m. A knob 22 is mounted on the motorboard 12 for manual changing of the turntable speed to 16 r.p.m., 33⅓ r.p.m., 45 r.p.m., or 78 r.p.m. as desired.

At the completion of each record play, mechanism is set in motion to lift the tone arm from the surface of the topmost record tablet on the turntable, to swing the tone arm outwardly to the position shown in solid lines in Fig. 1, and swing the tone arm back to positions 20*a*, 20*b*, or 20*c*. The extent of the backswing is determined by an indexing assembly which is responsive to the diameter of the record dropped.

In the present instance, the indexing assembly includes a flag 31, which during the course of each automatic record changing cycle, is moved from the position shown in dot-and-dash lines in Fig. 1 to the position shown in solid lines in that figure. In this position, the flag 31 is in the path of fall of a ten-inch record tablet. In the event that a 10-inch record tablet is dropped on the turntable, the flag 31 is moved back to the position shown in dot-and-dash lines and the backswing of the tone arm 20 is determined by an indexing plate 28 forming a part of the indexing assembly. An upstanding lever 26 is arranged in the path of fall of a 12-inch record and is operated to set the position of the indexing plate 28 so that the backswing of the tone arm 20 is limited to the position shown at 20*a* in Fig. 1. The operation of the sensing and indexing mechanism is set forth in detail in the above-mentioned application of Niziolek and Bara.

Referring now more particularly to Fig. 2, the mechanism for effecting the automatic cycle of operation is actuated by a pinion 29 formed on a hub on the turntable 14. At the initiation of each automatic cycle, a gear 30 is brought into meshing relation with the pinion 29. Mounted on the gear 30 is a drive pin 32 which is received in a slot 34 formed in a slidable carriage 36. Upon rotation of the gear 30, the carriage 36 is urged radially outwardly to effect the above-described automatic record changing operations.

According to the present invention, means are provided for changing the speed of the turntable to correspond to the requisite reproducing speed of a record tablet dropped thereon. In the present instance, the speed changing mechanism is responsive to the movement of the indexing plate 28 shown in Fig. 5 and is actuated by the carriage 36 during the course of its sliding movement from its outer limit position to its inner limit position. To this end, an actuator bar 39 is secured to the bottom surface of the carriage 36 and has a free end 41 extending outwardly thereof. A flange 43 extends upwardly from the free end 41 for a purpose hereafter described.

Referring now to Figs. 3, 4 and 5, a guide bar 45 is pivotally connected to one end of the indexing plate 28 at 47. The opposite end of the guide bar 45 is connected to a tension spring 49, the other end of which is connected to a post 51 depending from the undersurface of the motorboard. Intermediate the ends of the guide bar 45 is a plate 53 having openings 55 and 57 for the slidable reception of the free ends of push rods 59 and 61. The opposite ends of the push rods 59 and 61 are connected to arms 63 and 65 respectively of a compound lever 60*a*. The lever 60*a* is rotatably mounted on a shaft 62 to which is secured, on the opposite side of the motorboard, the knob 22 for manual selection of the several turntable speeds indicated. By the present invention the turntable speed may be changed from 45 r.p.m. to 33⅓ r.p.m. or vice versa by partial rotation of the lever 60*a* through the medium of the push rods 59 and 61. The mechanism for effecting this result will now be described.

Referring now more particularly to Fig. 3, an actuator dog 67 is mounted on the push rod 59, and an actuator dog 69 is mounted on the push rod 61. As shown in Fig. 7, each of the dogs 67 and 69 is secured in position on its respective push rod by means of a set screw 71. The dogs 67 and 69 are selectively moved into the path of travel of the flange 43 by the movement of the guide bar 45 in response to the movement of the indexing plate 28. In Fig. 3 the dog 67 has just been actuated by the flange 43 of the actuator bar 39 to move the lever 60*a* into the position shown. When the lever 60*a* is in this position, a cam plate 66 is actuated to the position shown to change the relative positions of the friction wheel 16 and the shaft of the motor 18 so that rotation of the turntable at 45 r.p.m. is effected. As in the above-mentioned application of Niziolek and Bara, the cam plate 66 is relieved to preclude retraction of the friction wheel 16 during the automatic speed changing operation. By this arrangement, power is made available throughout the record changing cycle to effect the required speed change.

In Fig. 4 is shown the position the push rods 59 and 61 assume for a change of turntable speed to 33⅓ r.p.m. In this position, the dog 69 is in the path of travel of the flange 43 of the actuator bar 39. Upon engagement of these elements, the push rod 61 is urged to the left, as viewed in that figure, to the position shown. The cam plate 66 is moved upwardly by the movement of the lever 60*a* so that the friction wheel 16 and the shaft of the motor 18 assume a different relative position.

As mentioned above, the turntable speed may be set manually by the knob 22 so that rotation is afforded at 16 r.p.m., 33⅓ r.p.m., 45 r.p.m. and 78 r.p.m. The present automatic speed changing mechanism, in the present instance, is effective to change the turntable speed between 33⅓ r.p.m. and 45 r.p.m. and vice versa. In the event that the turntable speed is set for 78 r.p.m., the push rods 59 and 61 will assume the position shown in Fig. 8, in which position the flange 43 is in alignment with the dog 67 of the rod 59 but no engagement occurs because the dog 67 has been moved by rotation of the lever 60*a* out of range of the path of travel of the flange 43. In Fig. 8*b* is shown the flange 43 in solid lines in the position it assumes when the carriage 36 is at its innermost limit position, and in dot-and-dash lines in the position it assumes when the carriage 36 is at its outer limit position.

Fig. 9 is similar to Fig. 8 but shows the rods 59 and 61 in the positions they assume when the knob 22 has been set for rotation of the turntable at 16 r.p.m. The dog 69 is in the path of travel of the flange 43 but is located slightly inwardly of the inner limit position of the actuator bar 39. Since there can be no engagement of the dog 69 by the flange 43, no change in turntable speed is effected.

In the event that a record of 12 inches diameter is dropped on the turntable, the speed changing mechanism is moved to the position shown in Fig. 10. The dog 69 is arranged so that it is engaged by the flange 43 and a change of turntable speed of 33⅓ r.p.m. is effected. The flat confronting surface of the dog 69 is dimensioned so that engagement can be made with the dog 69 when the speed changing assembly is either in the position shown in Fig. 4 or in the position shown in Fig. 10. In either position the turntable speed is changed to 33⅓ r.p.m. It will be noted that in Fig. 10 the flange 43 engages the dog 69 on the opposite side of the push rod 61.

The automatic record changer speed control herein described is capable of changing the speed of the turntable to correspond with the requisite reproducing speed of a record dropped on the turntable. The record tablets of varying diameters may be mixed indiscriminately, and the present device is capable of detecting the diameter of a particular record, determining the extent of backswing of the tone arm, and setting the turntable speed so that the record tablet is properly reproduced. In operation, the change in turntable speed is effected only when required by the character of a record dropped. For instance, if a record of 7 inches diameter is followed by a record of similar diameter no change in turntable speed is brought about. If, on the other hand, a record tablet of 10 inches diameter or 12 inches diameter is interposed between record tablets of 7 inches diameter, the turntable speed is changed to 33⅓ r.p.m. for the intermediate record and back to 45 r.p.m. for the 7-inch record. The present device is simple and reliable in operation.

It will be apparent that this invention may be embodied in devices which differ in many respects and details from the particular embodiment disclosed. All modifications which do not go beyond the scope of the invention will readily suggest themselves to those skilled in the art. It is, therefore, not intended that the invention be limited to the exact construction shown and described, but only to the inventive concept as defined in the appended claims.

I claim:

1. In a record changer having automatic cycles for the sequential playing of a plurality of record tablets of different diameters, a rotatable turntable having means for releasably supporting a stack of record tablets above the turntable and means for dropping one of said tablets on said turntable during each cycle, a tone arm adapted for vertical and horizontal swinging movement relative to said turntable, a sliding carriage for effecting said tone arm movement, indexing means having a normal position and a position corresponding to each of a plurality of record diameters, means operable during each cycle for operating said indexing means to a position corresponding to the diameter of the record tablet dropped on said turntable, means operative in response to the movement of said indexing means for limiting a backswing of said tone arm to a position corresponding to the diameter of the record tablet dropped on the turntable during a cycle and means actuable by said carriage and operable in response to the position of said indexing means for varying the speed of said turntable to correspond to the reproducing speed associated with the diameter of the record dropped, said last-named means including an actuator bar on said carriage, a plurality of rods positionable by said indexing means into or out of engagement with said actuator bar.

2. In a record changer having automatic cycles for the sequential playing of a plurality of record tablets of different diameters, a rotatable turntable having means for releasably supporting a stack of record tablets above the turntable and means for dropping one of said tablets on said turntable during each cycle, a tone arm adapted for vertical and horizontal swinging movement relative to said turntable, a sliding carriage for effecting said tone arm movement, indexing means having a normal position and positions corresponding to the set down playing positions of the tone arm for a plurality of record diameters, means operable during each cycle for moving said indexing means to a position corresponding to the set down playing position of the record tablet dropped on said turntable, means operative in response to the movement of said indexing means for limiting a backswing of said tone arm to a playing position corresponding to the diameter of the record tablet dropped on the turntable during a cycle, and means for varying the speed of said turntable to correspond to the reproducing speed associated with the diameter of the record dropped, said last-named means including a reciprocating member carried by said carriage and having a shoulder facing in one direction and a cam in the opposite direction, a pair of push rods each having a shoulder facing in said opposite direction and a cam surface facing in said one direction and adapted to assume one position for operating the turntable at one of said speeds and another position for operating the turntable at another of said speeds, and means controlled by said indexing means for selectively bringing one of said rod shoulders into the path of said member shoulder, said reciprocating member being actuated by said carriage to operate said push rods to locate them in one of said positions.

3. In a record changer having automatic cycles for the sequential playing of a plurality of record tablets of different diameters, a rotatable turntable having means for releasably supporting a stack of record tablets above the turntable and means for dropping one of said tablets on said turntable during each cycle, a tone arm adapted for vertical and horizontal swinging movement relative to said turntable, a sliding carriage for effecting said tone arm movement, indexing means having a normal position and a position corresponding to each of a plurality of record diameters, means operable during each cycle for operating said indexing means to a position corresponding to the diameter of the record tablet dropped on said turntable, means operative in response to the movement of said indexing means for limiting a backswing of said tone arm to a position corresponding to the diameter of the record tablet dropped on the turntable during a cycle, and means for varying the speed of said turntable to correspond to the reproducing speed associated with the diameter of the record dropped, said last-named means including a lever operable to vary the turntable speed, an actuator bar mounted on said carriage and extending outwardly therefrom and a pair of rods pivotally connected to the lever, and an actuating dog mounted on each of said rods, means controlled by said indexing means for moving said dogs and actuator bar with respect to each other to shift said dogs into or out of the path of travel of said actuator bar for selective pushing of one or the other of said rods by said actuator bar in one direction to actuate said lever and vary the turntable speed accordingly said dogs being deflected laterally by said actuator bar when moving in the opposite direction.

4. In a record changer having automatic cycles for the sequential playing of a plurality of record tablets of different diameters, a rotatable turntable having means for releasably supporting a stack of record tablets above the turntable and means for dropping one of said tablets on said turntable during each cycle, a tone arm adapted for vertical and horizontal swinging movement relative to said turntable, a sliding carriage for effecting said tone arm movement, indexing means having a normal position and a position corresponding to each of a plurality of record diameters, means operable during each cycle for operating said indexing means to a position corresponding to the diameter of the record tablet dropped on said turntable, means operative in response to the movement of said indexing means for limiting a backswing of said tone arm to a position corresponding to the diameter of the record tablet dropped on the turntable during a cycle, lever means for varying the speed of said turntable to correspond to the reproducing speed associated with the diameter of the record dropped, and means for actuating said lever including an actuator member on said carriage, a pair of rods pivotally connected at one end to the lever to actuate same for varying the turntable speed, an actuating dog mounted on each of said rods intermediate its ends, means controlled by said indexing means supporting the other ends of said rods for moving said dogs laterally for selective movement of said rods in one direction or the other to be engaged selectively by said actuator member, said rods deflecting laterally when a dog is engaged by said actuator member moving in the opposite direction.

5. In a record changer having automatic cycles for the sequential playing of a plurality of record tablets of different diameters, a rotatable turntable having means for releasably supporting a stack of record tablets above the turntable and means for dropping one of said tablets on said turntable during each cycle, a tone arm adapted for vertical and horizontal swinging movement relative to said turntable, a sliding carriage for effecting said tone arm movement, indexing means having a normal position and a position corresponding to each of a plurality of record diameters, means operable during each cycle for operating said indexing means to a position corresponding to the diameter of the record tablet dropped on said turntable, means operative in response to the movement of said indexing means for limiting a backswing of said tone arm to a position corresponding to the diameter of the record tablet dropped on the turntable during a cycle, and means actuable by said carriage and operable in response to the position of said indexing means for varying the speed of said turntable to correspond to the reproducing speed associated with the diameter of the record dropped, said last-named means including an actuating member on said carriage reciprocated rectilineally and a plurality of rods having dogs thereon and a guide bar actuable in response to the movement of said indexing means for selectively positioning said dogs in the path of travel of said actuator member for movement of said rods in one direction or the other to vary the speed of said turntable.

References Cited in the file of this patent

UNITED STATES PATENTS

| | | |
|---|---|---|
| 477,325 | Manning et al. | Dec. 24, 1937 |
| 2,578,792 | Faulkner | Dec. 18, 1951 |
| 2,632,650 | Offutt | Mar. 24, 1953 |
| 2,763,487 | Fortune | Sept. 18, 1956 |